July 6, 1965  W. E. TWAMLEY  3,192,798
SPINDLE TRANSMISSION
Filed Aug. 28, 1962  4 Sheets-Sheet 1

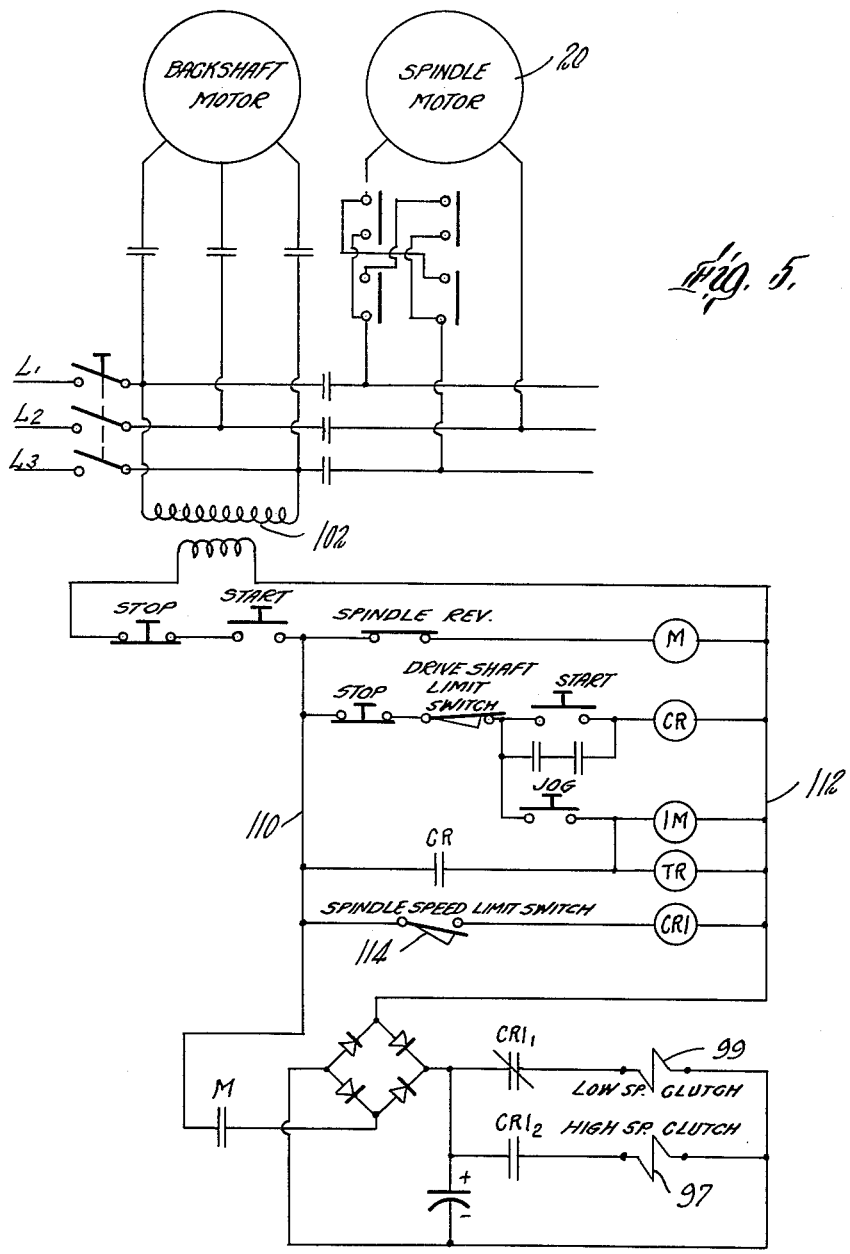

3,192,798
SPINDLE TRANSMISSION
William E. Twamley, Providence, R.I., assignor to Brown
 & Sharpe Manufacturing Company, Providence, R.I.,
 a corporation of Rhode Island
Filed Aug. 28, 1962, Ser. No. 219,942
4 Claims. (Cl. 74—722)

The present invention relates to automatic screw and similar machines of the general type having a rotating spindle, and more particularly to an improved transmission for use in a machine of the general type referred to in which the spindle is driven alternatively by means of one of two driven elements loosely mounted to turn on the spindle and a clutching device interposed between said elements shiftable for clutching the spindle to be driven alternatively by one or the other of them.

It is a principal object of the invention to provide an improved and more versatile spindle transmission which is readily adapted for operation at a very large number of accurately graduated speeds including a substantial number of such speeds in a reverse direction.

It is a further object of the invention to provide a variable speed transmission adapted for a large number of speed adjustments which is of simple construction and in which the adjustments can be made with a minimum of effort.

With these and other objects in view as may hereinafter appear a feature of the invention consists in the construction and arrangement of the transmission whereby one driven element is driven at an adjusted rate within a first speed group according to the setting of one rate changer or alternatively at an adjusted rate within a second speed group according to the setting of two rate changers connected in series, and the other said driven element is adapted to be driven at an adjusted rate within a third speed group which is determined by one of said rate changers in series with a third rate changer, or alternatively at an adjusted rate within a fourth speed group which is determined by connecting of all three of said rate changers in series.

With the above and other objects in view as may hereinafter appear the several features of the invention will be readily understood by one skilled in the art from the following description taken in connection with the accompanying drawings, in which:

FIG. 5 is a single line diagram of the electrical connections for controlling the spindle drive including particularly the spindle motor and low and high speed clutch connections forming part of said change speed gearing for the spindle.

Figure 1:
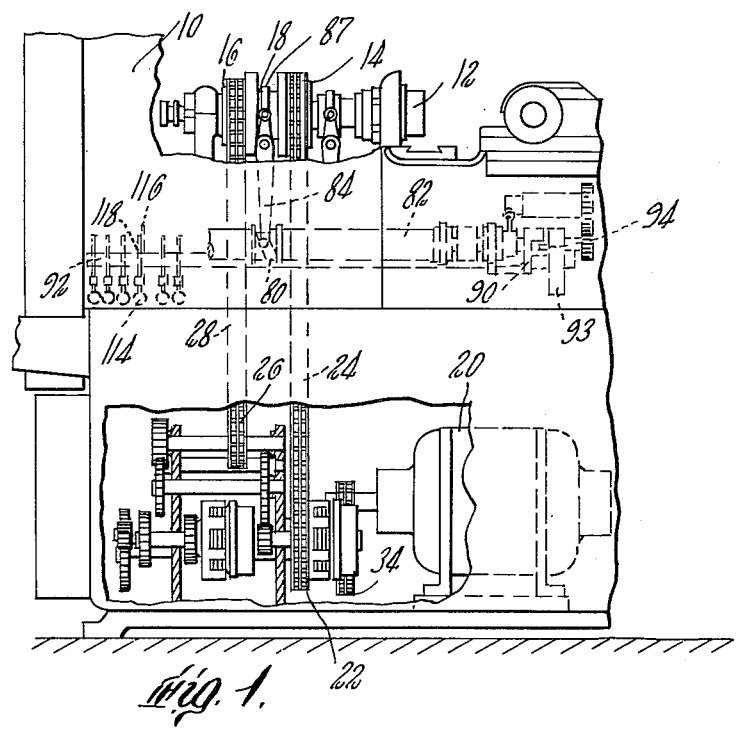
FIG. 1 is a view in front elevation of a portion of an automatic screw machine with portions of the casing broken away to illustrate particularly the spindle driving mechanism, only so much of the machine having been disclosed as is believed necessary to illustrate the connection of the present invention therewith.
Figure 2:
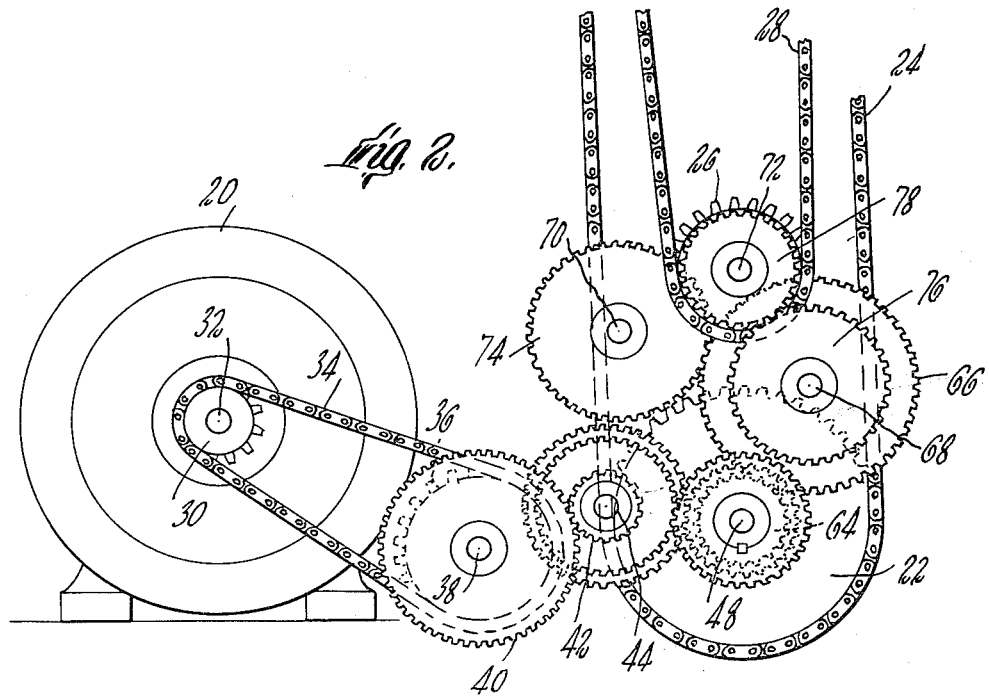
FIG. 2 is a detail end view of an enlarged scale of the driving motor and change speed gears of the spindle driving mechanism shown in FIG. 1.

The invention is herein disclosed as embodied in an automatic screw machine which may be of ordinary construction comprising with a casing 10, a rotary hollow work spindle 12 having loosely mounted thereon two driven sprocket wheels 14, 16 and a clutch element 18 keyed to the shaft and arranged to be shifted alternatively into clutching engagement with one or the other of said driven sprockets 14 and 16.

The variable speed transmission for the spindle 12 which forms the subject matter of the invention comprises a spindle driving motor 20 and intervening change speed gearing which connects with a high-speed sprocket 22 and a sprocket chain 24 passing around the sprocket wheel 14, and a low-speed sprocket 26 and a sprocket chain 28 passing round the sprocket wheel 16. A sprocket 30 mounted on the motor shaft 32 is connected by a sprocket chain 34 with a sprocket 36 connected to drive a shaft 38 forming part of said transmission. The shaft 38 is connected by means of pick-off gears 40, 42 with a counter shaft 44. The pick-off gears 40, 42 constitute a first rate changer in said transmission. The drive is taken from the counter shaft 44 by either of two alternative paths to the driven sprocket wheel 22 which is secured on a sleeve member 46 carried on a third transmission shaft 48 parallel to the shafts 38 and 44. A high-speed drive is taken from the first speed changer (pick-off gears 40, 42) and counter shaft 44 through a gear 50 secured to the shaft 44 and a meshing gear 52 which is loosely mounted to turn on the shaft 48 and has secured thereto one element 54 of a multiple disc clutch, the other element 55 of which is keyed to the sleeve member 46.

A second group of speeds is obtained through an alternative chain of gearing to the high speed sprocket wheel 22 which includes a pair of pick-off gears 56, 58 which constitute a second gear changer. The pick-off gears 56, 58 are mounted respectively on the counter shaft 44 and on the transmission shaft 48. For said second group of speeds the drive is taken through the first gear changer (pick-off gears 40, 42) through said second gear changer (pick-off gears 56, 58) and transmission shaft 48 to one element 60 of a multiple disc clutch keyed to the shaft 48. A cooperating element 62 of said clutch is secured to the sleeve member 46 which carries the high-speed sprocket 22.

With the illustrated construction a third group and a fourth group of different speeds are obtained by shifting the spindle clutch 18 so that the spindle is driven from the driven element 16 through a chain of gears including a third speed changer which connects with the low-speed driving sprocket 26 and driven element 16. The drive to the low-speed driving sprocket 26 will include either one or both of the speed changers above described and the sleeve member 46 driven thereby. A driving gear 64 on sleeve 46 meshes with a gear 66 on a shaft 68 forming one of three triangulated transmission shafts 68, 70 and 72, the low-speed driving sprocket 26 being mounted on shaft 72. The driven gear 66 meshes also with a gear 74 on shaft 70 so that both of the transmission shafts 68, 70 are positively driven but in opposite directions. The shaft 72 and driving sprocket 26 are driven in one or the other direction by means of two pick-off gears 76, 78 of which the gear 76 may be mounted on either of the oppositely driven shafts 68 of 70 and meshes with the gear 78 on shaft 72. The pick-off gears 76, 78 constitute a third rate changer in the variable speed transmission for the spindle 12.

With the arrangement shown, and assuming that the spindle clutch 18 has been shifted to disconnect the driven element 14 and to operatively connect the driven element 16 with the spindle, the third group of speeds is obtained when the clutch 54, 55 is engaged, the drive being taken through the first rate changer, pick-off gears 40, 42 and thence through the driving sleeve member 46 to the rate changer comprising pick-off gears 76, 78, the direction of drive being determined as above noted by the location of gear 76 on shaft 68 or 70.

An alternative fourth group of speeds is obtained when the clutch 54, 55 is disengaged and the clutch 60, 62 is engaged. For this fourth group of speeds the drive is taken through the first rate changer (pick-off gears 40, 42), through the second rate changer (pick-off gears 56, 58), through transmission shaft 48, clutch 60, 62, and sleeve 46, and through the rate changer (pick-off gears 76, 78) to the low-speed driving sprocket 26.

The variable speed transmission above described and illustrated is adapted to make readily available to the operator a very large number of speed changes. Assuming a gear change set of eighteen pairs of gears ranging from 76 to 19 teeth, there will be 18 possible speeds in the first speed group utilizing only the first rate changer. There are 180 possible speeds in the second speed group utilizing the first gear changer in combination with the second rate changer. For this purpose four gears of the eighteen pairs provided will be utilized at one time in various combinations in the first and second rate changers. There are 270 possible speed changes in the third speed group in which the first and third rate changers are employed and 2700 speed changes are available in the fourth speed group in which all three rate changers are used in series.

The illustrated construction has the particular advantage that in those cases in which the low-speed sprocket 16 is driven in the reverse direction, a very wide range of available speeds is made available for the operation of the spindle 12 in each direction.

The illustrated machine is constructed and arranged to effect an automatic shift of said variable speed spindle drive from any one to another of the four available speed groups above described. The shift between speed groups I or II assuming one position of spindle clutch 18, and between speed groups III and IV assuming the alternate position of spindle clutch 18 is effected by a simultaneous shift of the two clutches 54, 55 and 60, 62 causing one to be energized and the other to be de-energized. A shift between the selected one of the two speed groups I and II on the one hand and the selected one of the two speed groups III and IV on the other hand is effected by shifting the spindle clutch element 18 to operatively connect the high speed driven element 14 or alternatively the low-speed driven element 14 with the spindle 12.

In accordance with the usual practice in these machines, the position of the clutch member is automatically controlled by means of a shift cam 80 on a rear drive shaft 82 having mounted thereon a cam shifting element which acts against the lower end of a vertically arranged clutch shifting lever 84. At its upper end the clutch shifting lever 84 is formed as a yoke to receive a clutch shifting collar 87 forming part of the clutch assembly 18. The clutch shifting cam 80 is arranged to be driven through a part revolution by means of connections which include a part revolution clutch not specifically shown on the rear drive shaft 82, a clutch shift lever 90, and a control disc 93 secured to the front cam shaft 92, and a dog 94. The front cam shaft 92 is driven through one revolution for each operating cycle of the machine through connections, not specifically shown, with the front cam shaft 92. Since this mechanism is well known and forms specifically no part of the invention, no further illustration thereof is believed necessary.

The clutch 54, 55 is actuated by means of a cylindrically shaped solenoid 97 and armature 98 which carries the movable plates 56 of the clutch. The clutch 60, 62 is similarly actuated by means of a solenoid 99 and armature 100 on which are mounted the movable plates 60 of the clutch 60, 62.

Figure 4:
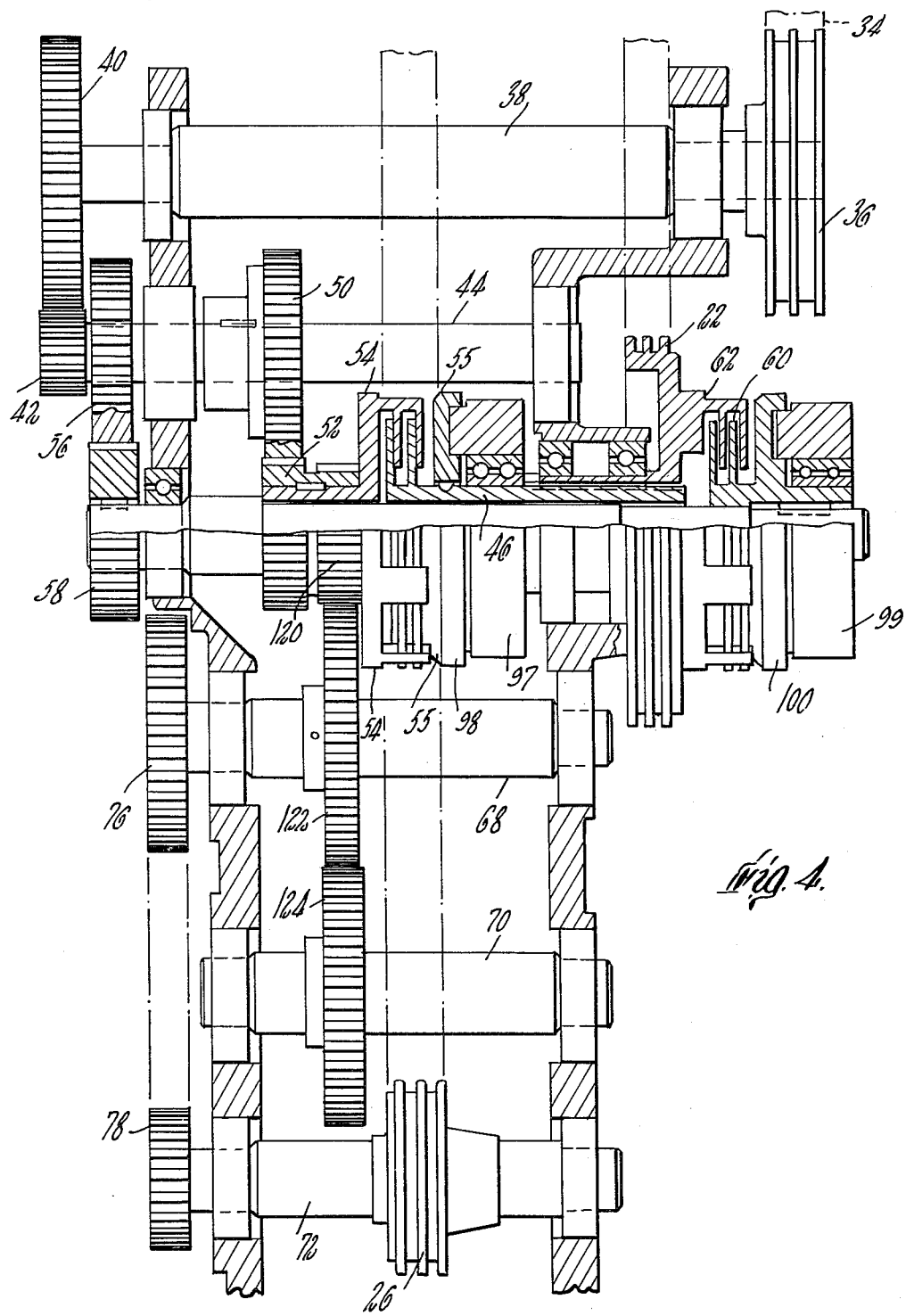
FIG. 4 is a developed view similar to FIG. 3, of the vertical speed gearing for driving the spindle, but illustrating a modified form of said gearing.

Electrical operating connections are provided for the solenoids 97 and 99 so constructed and arranged as to permit one only of said clutch engaging solenoids to be energized at a time. Only so much of the electrical system referred to is herein shown or described as is believed necessary to illustrate the connection of the invention therewith. The electrical control system for the machine as shown in FIG. 4 is supplied by a three phase power line marked $L_1$, $L_2$ and $L_3$. The spindle motor 20 is connected to be driven therefrom through reversing switch connections which may be of ordinary description. A transformer 102 connected across lines $L_1$, $L_3$ provides current for a control circuit including a main lead-in line 110, and a return line 112. A main stop switch and a start switch, so marked, are provided in the line 110 for starting and stopping the machine. The two clutches are shifted from one to the other of their alternative positions in which first one and then the other clutch is closed and the remaining clutch in each instance is released by means of a cam actuated switch 114 (see FIGS. 1 and 5) having two alternative positions. The switch is shifted first to one and then to the alternate position by means of dogs 116 adjustably mounted about the periphery of a disc 118 on the front cam shaft 92.

Referring to FIG. 5 the switch 114 is connected in series with a relay CRI having two sets of contacts $CRI_1$ and $CRI_2$ which are arranged so that whenever one is closed the other is opened. The contacts $CR_1$ when closed energize the low-speed clutch solenoid 99. The contacts $CRI_2$ when closed energize the high speed clutch solenoid 97.

In operation it is possible automatically to select any one of four speeds for any portion of an automatic cycle in which the front cam shaft 92 of the machine is turned through a complete revolution. It is assumed that a pair of pick-off gears 40, 42 has been selected which, when clutch 54, 55 is engaged and clutch 18 has been shifted to the high-speed position, will drive the high-speed sprocket 22 at speed I, that a pair of pick-off gears 56, 58 has been selected which when a clutch 60, 62 is engaged will act in cooperation with the selected pick-off gears 40, 42 to drive the high speed spindle sprocket 22 at speed II, and that a pair of pick-off gears 76, 78 have been selected which will cause the low-speed sprocket 26 to be driven at speed III or speed IV depending upon whether the clutch 54, 55 or clutch 60, 62 is engaged, and further assuming that the high speed-low speed clutch 18 has been shifted from the high-speed to the low-speed position. Speed III is determined by a combination of the selected pair of pick-off gears 40, 42 and the selected pair of pick-off gears 76, 78. Speed IV is determined by the combination of the selected first pair of pick-off gears 40, 42, the selected second pair of pick-off gears 56, 58, and the selected third pair of pick-off gears 76, 78.

Assuming that the spindle 12 is to be driven at a selected speed from Group I and thereafter at speeds selected from Groups II, III and IV in succession during the performance of a single cycle of operation, a dog 94 on the control disc 93 engages the clutch shift lever 90 to operate the shift cam 80 and clutch shifting lever 84 to engage the clutch 18 with the high-speed sprocket 14. At the same time, a dog 116 mounted on control disc 118 actuates the limit switch 114 to energize solenoid CRI (FIG. 5) to close the high-speed clutch contact $CRI_2$ and to open the low-speed clutch contact $CRI_1$ thus engaging the magnetic clutch 54, 55 and to disengage the magnetic clutch 60, 62. The drive is now taken from the driving sprocket 36 and drive shaft 38 through a selected pair of pick-off gears 40, 42 of the first rate changer through shaft 44 and sleeve member 46 to the high-speed driven element 22.

Assuming that the spindle is to be next driven at a speed selected from Group II, the spindle clutch 18 remains engaged with the high-speed sprocket 14, a second dog 116 engages the switch 114 which is switched to its alternate position in which solenoid CRI is de-energized, the high-speed switch contact $CRI_2$ is opened to disengage magnetic clutch 54, 55 and the low-speed clutch contact $CRI_1$ is closed to energize solenoid 99, 100. For this position of the parts the drive is taken from the driving sprocket 36 and driving shaft 38 to pick-off gears 40, 42 of the first rate changer and through a selected pair of change-speed gears 56, 58 of the second rate changer and through shaft 48 and clutch 60, 62 to drive the high-speed driven element 22 and high-speed sprocket 14 at the adjusted speed of Group II.

Assuming that the spindle is to be next driven at a selected speed from Group III, the dog on the control disc 93 acts on the clutch shift lever 90 and connections above referred to, to shift the spindle clutch 18 to its alternate position in engagement with the low-speed driving sprocket 16. At the same time dog 116 on control disc 118 operates switch 114 to again energize solenoid CRI thereby energizing clutch solenoid 97. For this position of the several controls, the drive is taken from the drive sprocket 36 and shaft 38 through the selected pair of pick-off gears 40, 42 of the first rate changer, through the driving sleeve 46 thence through gears 64, 66 and through a selected pair of pick-off gears 76, 78 of the third rate changer to the slow speed driven member 26 to drive the spindle at a selected speed from Group III.

Assuming finally that the spindle is to be driven at a selected speed from Group IV, the spindle clutch 18 is retained in the low-speed position engaged with the spindle low-speed driving sprocket 16. A dog 116 on the control disc 118 again actuates the switch 114 to de-energize the solenoid CRI so that the low-speed clutch switch contacts $CRI_1$ are closed to engage the magnetic clutch 60, 62, while at the same time the high-speed clutch switch contacts $CRI_2$ are opened to disengage the magnetic clutch 54, 55. For this position of the controls the drive will be taken from the drive sprocket 36 and shaft 38 through the selected pair of pick-off gears 40, 42 of the first rate changer, through a selected pair of pick-off gears 56, 58 of the second rate changer to the sleeve member 46. Thence the drive is taken through gears 64, 66 to pick-off gears 76, 78 of the third rate changer to the low-speed driven element 26 and to the low-speed spindle driving sprocket 16.

Figure 3:
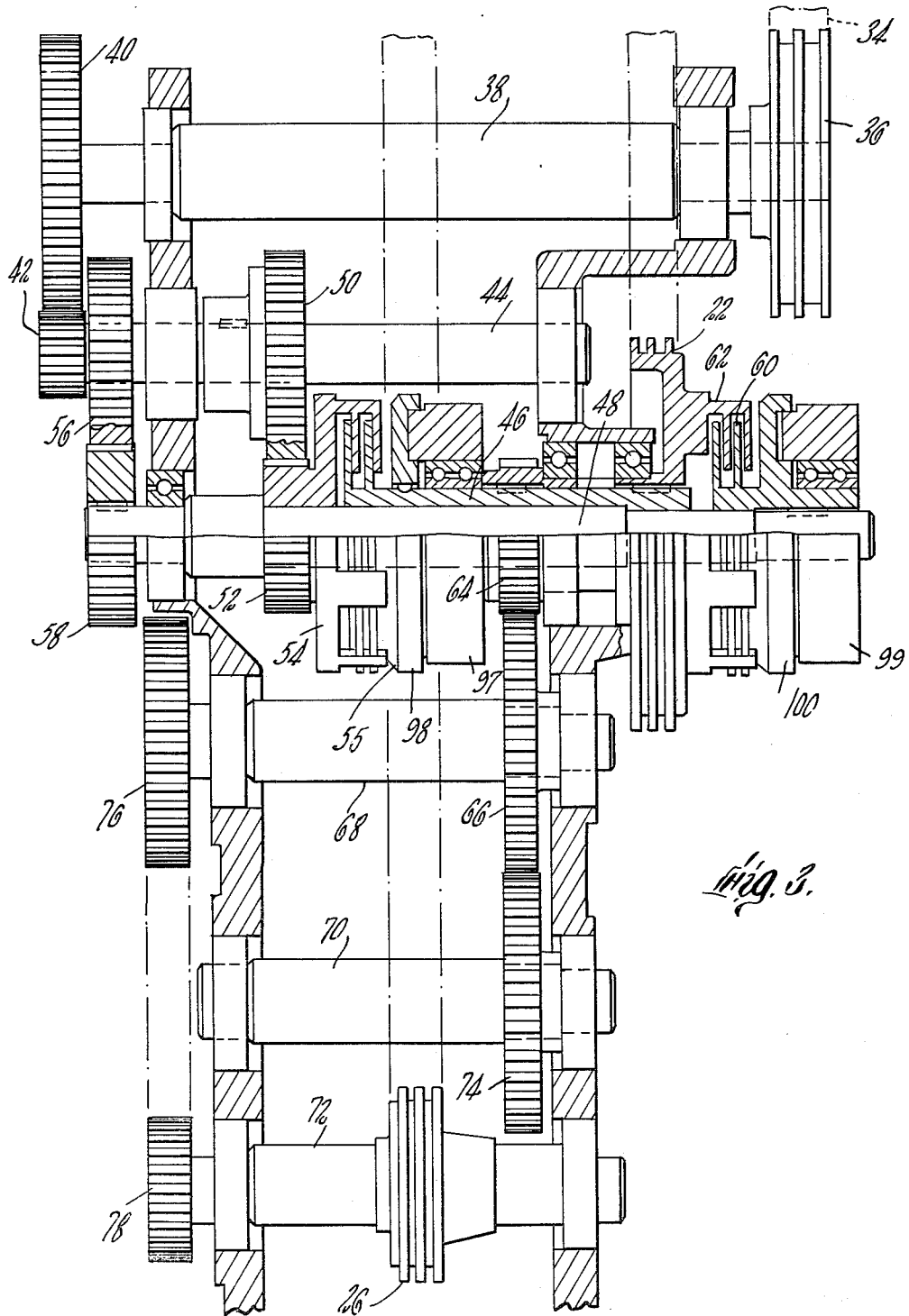
FIG. 3 is a developed view of the variable speed gearing for driving a spindle shown in FIGS. 1 and 2.

FIG. 4 of the drawings illustrates a modified form of the variable speed spindle drive in which the pair of pick-off gears 76, 78 comprising the third rate changer are connected only in combination with the pick-off gears 40, 42 to provide a third transmission line by means of which the spindle is driven from the low-speed driven element 26. The variable speed spindle transmission shown in FIG. 4 is identical with that shown in FIG. 3 except that the driving gear 64 on the sleeve member 46 and the mating gear 66 have been omitted and have been replaced by a gear 120 which is keyed to the driving clutch member 54 and gear 52 loosely supported to turn on the shaft 48, and a gear 122 on the shaft 68 mating with gear 120. In the modified arrangement, the shaft 70 is continuously driven in the reverse direction from the shaft 68 by means of a gear 124 on shaft 70 which meshes with the gear 122 on shaft 68.

With this arrangement the position of the electrically controlled clutch elements 54, 55 and 60, 62 is immaterial. The drive is taken from the driving sprocket 36 and shaft 38 through the pick-off gears 40, 42 from the first rate changer to shaft 44 thence through gears 50, 52 to the gear 120 which as above noted is connected through gears 120, 122 and 124 to drive the shafts 68, 70 continuously in opposite directions. The drive is taken from one of the shafts 68 or 70 through pick-off gears 76, 78 to driven shaft 72 and the driven element 26 which is thus driven in the selected direction through a third transmission line which includes the first rate changer comprising pick-off gears 40, 42 and the third rate changer comprising pick-off gears 76, 78. This simplified arrangement differs from that specifically shown in the previous arrangement in that the fourth transmission line including in combination the selected pick-off gears of all three separate rate changers is not available.

The invention having been described what is claimed is:

1. A variable speed transmission for a machine tool spindle having, in combination, a rotary spindle, a rotationally driven power input element, a first spindle driving element, a second spindle driving element, a spindle clutch shiftable to connect said spindle driving elements alternatively to drive said spindle, driving connections between said power input element and said first spindle driving element including a first pair of pick-off gears forming a first rate changer partially defining a first transmission line, further driving connections between said first rate changer and said first spindle driving element including a second pair of pick-off gears forming a second rate changer connected to be driven from said first rate changer and defining with said first rate changer a second transmission line, clutching means shiftable to connect said first or said first and said second rate changers alternatively to drive said first spindle driving element to provide a first and second group of speeds for said spindle, a third pair of pick-off gears forming a third rate changer connected to be driven from one of said first or said first and second rate changers defining in combination therewith a third transmission line connected with said second spindle driving element providing a third group of speeds for said spindle, and means for shifting each of said spindle clutch and said clutching means to selectively connect any one of said first, second and third transmission lines to drive said spindle.

2. A variable speed transmission for a machine tool spindle having, in combination, a rotary spindle, a rotationally driven power input element, a first spindle driving element, a second spindle driving element, a spindle clutch shiftable to connect said spindle driving elements alternatively to drive said spindle, a first pair of pick-off gears forming a first rate changer driven by said input element partially defining a first transmission line, a second pair of pick-off gears forming a second rate changer connected to be driven from said first rate changer and defining with said first rate changer a second transmission line, clutching means shiftable to connect said first or said first and said second rate changers alternatively to drive said first spindle driving element to provide a first and second group of speeds for said spindle, a pair of drive shafts connected to be driven in reverse directions from said first rate changer, a driven shaft operatively connected with said second spindle driving element, and a third pair of pick-off gears supported on one of said reversely driven drive shafts and on said driven shaft forming a third rate changer connected to be driven from said first rate changer and defining with said first rate changer a third reversible transmission line connected with said second spindle driving element providing a third group of selected speeds and in reverse directions for said spindle.

3. A variable speed transmission for a machine tool spindle having, in combination, a rotary spindle, a rotationally driven power input element, a first spindle driving element, a second spindle driving element, a spindle clutch shiftable to connect said spindle driving elements alternatively to drive said spindle, a first pair of pick-off gears forming a first rate changer driven by said input element partially defining a first transmission line, a second pair of pick-off gears forming a second rate changer connected to be driven from said first rate changer and defining with said first rate changer a second transmission line, clutching means shiftable to connect said first or said first and said second rate changers alternatively with said first spindle driving element to provide with said first spindle driving element a first and second group of speeds for said spindle, a third pair of pick-off gears forming a third rate changer connected between said clutch driven first spindle driving element and said second spindle driving element, said third pick-off gear rate changer providing for a first position of said clutching means and the alternate position of said spindle clutch a third transmission line including said first rate changer, said third rate changer and second spindle driving element, and providing for the alternate position of each of said clutching means and spindle clutch a fourth transmission line including said first, second and third rate changer and said second spindle driving element.

4. A variable speed transmission for a machine tool spindle having a rotary spindle, a first spindle driving element and a second spindle driving element, and a spindle clutch shiftable to connect said spindle driving elements alternatively to drive said spindle, the combination of a power input shaft, a counter shaft, a drive shaft supported in parallel relation to said input shaft, a first driven member loose on said drive shaft connected with said first spindle driving element, a sleeve driving member loose on said drive shaft and means connecting said counter shaft to drive said sleeve driving member, individual magnetic clutches drivingly included between said sleeve driving member and said driven member and between said drive shaft and said driven member, a first pair of pick-off gears on said input shaft and on said counter shaft forming a first rate changer defining a first transmission line, a second pair of pick-off gears mounted on said counter shaft and on said drive shaft, and defining with said first rate changer a second transmission line, a second drive shaft operatively connected to drive said second spindle driving element, driving connections between said first driven member and said second drive shaft comprising a pair of driven shafts, and gear connections between said first driven member and said driven shafts for driving said driven shafts in opposite directions, a third pair of pick-off gears supported on one of said oppositely driven shafts and on said second drive shaft forming a third rate changer providing with said first rate changer a third reversible transmission, and with said first and second rate changers defining a fourth reversible transmission line, and automatic means controlled by the machine for shifting said spindle clutch and for shifting each of said magnetic clutches to operate said spindle through a selected one of said four selected transmission lines.

References Cited by the Examiner
UNITED STATES PATENTS 2,633,754  4/53  Gerst.
2,867,126  1/59  Bolster _____ 74—331 X
3,073,423  1/63  Lee et al.

FOREIGN PATENTS 442,820  2/36  Great Britain.

DON A. WAITE, *Primary Examiner.*